United States Patent [19]
Tucker et al.

[11] 3,880,957
[45] Apr. 29, 1975

[54] GRAFT COPOLYMERS OF VINYLIDENE MONOMERS ONTO TRIHALOMETHYL HYDROCARBON GLYCIDYL ETHER POLYMERS

[75] Inventors: Harold A. Tucker, Shaker Heights; Richard V. Kemp, Akron, both of Ohio

[73] Assignee: The B. F. Goodrich Company, Akron, Ohio

[22] Filed: June 3, 1974

[21] Appl. No.: 475,408

Related U.S. Application Data

[62] Division of Ser. No. 350,326, April 12, 1973, Pat. No. 3,833,522, which is a division of Ser. No. 163,991, July 19, 1971, abandoned.

[52] U.S. Cl. .................. 260/901; 260/2 A; 260/4 R; 260/47 UA; 260/615 B; 260/615 BF; 260/836; 260/874; 260/887; 260/888; 260/889; 260/890; 260/897; 260/898; 260/899

[51] Int. Cl. ... C08f 39/00; C08f 29/12; C08f 29/30

[58] Field of Search.. 260/874, 2 A, 615 B, 615 BF, 260/901

[56] References Cited

UNITED STATES PATENTS

| | | | |
|---|---|---|---|
| 3,214,390 | 10/1965 | Vandenberg | 260/2 A |
| 3,546,321 | 12/1970 | Jabloner et al. | 260/874 |
| 3,833,522 | 9/1974 | Tucker et al. | 260/2 A |

*Primary Examiner*—Murray Tillman
*Assistant Examiner*—Richard B. Turner
*Attorney, Agent, or Firm*—Alan A. Csontos

[57] ABSTRACT

Trihalomethyl hydrocarbon glycidyl ethers of the formula $$\overset{O}{CH_2-CHCH_2}-O-R-CX_3$$

wherein X is —Cl, —Br, or —I and R is an alkyl, cycloalkyl, aryl, alkaryl, or aralkyl radical of one to 12 carbon atoms, readily homopolymerize or copolymerize with other epoxide $$(>C\overset{}{\underset{O}{—}}C<)$$

containing monomers to yield useful high molecular weight polyether polymers. The polyether compositions have particular utility as substrates onto which vinylidene $$(CH_2=C<)$$

monomers can be grafted using metal complexes as catalysts to provide improved polymers.

7 Claims, No Drawings

GRAFT COPOLYMERS OF VINYLIDENE MONOMERS ONTO TRIHALOMETHYL HYDROCARBON GLYCIDYL ETHER POLYMERS

This is a division of application Ser. No. 350.326 filed Apr. 12, 1973, now U.S. Pat. 3,833,522 which in turn is a division of application Ser. No. 163,991, filed July 19, 1971, and now abandoned.

BACKGROUND OF THE INVENTION

Polyether polymers are well known to the art. Their good solvent, oil, and water resistance and broad functional temperature range makes them useful materials for preparing compound goods. The compositions are numerous due to the large choice of epoxy and cyclic ether monomers available. However, in certain applications such as in blends with dienic polymers, use with fibers where dye affinity is necessary, and the like, the polyethers do not have the necessary solubility, chemical, and/or rheological properties. For these applications it is desirable to have polymer compositions containing both epoxy and vinylidene

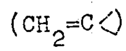

monomer structures. To achieve this, those skilled in the art have grafted vinylidene monomers onto polyether backbones. In this manner, a composition could retain the low temperature flexibility and oxidative stability of the polyether and yet have rheological, chemical, and/or solubility characteristics similar to vinylidene-monomer polymers.

A known graft process is to contact a polyether polymer substrate with a vinylidene monomer (s) and then to generate free radicals to initiate polymerization and cause grafting. However, the process affords little control over the location and the amount of grafting, and often produces significant amounts of vinylidene homopolymer. If the conditions employed are too energetic, the polyether backbone will undergo chain scisson rendering the polymer a wax or a liquid.

Jabloner et al, in U.S. Pat. No. 3,546,321, teaches a method of obtaining a graft composition of a polyether substrate and grafted vinylidene monomer(s) (s) comprising (1) the reaction of a polyether polymer, having a hydrogen atom attached to a carbon alpha to the ether oxygen, with oxygen and a free radical generating agent to form a hydroperoxidized polyether polymer, and (2) the use of the hydroperoxidized polyether as a free radical generating catalyst to initiate polymerization of vinylidene monomers and cause grafting. The process is limited in that although the hydroperoxy group is formed at a known site, the location of the site(s) is not readily controllable. The hydroperoxidizing reaction also results in some polyether chain scission, the grafting reaction can produce a significant amount of vinylidene homopolymer, the process involves at least two separate steps, and the prepared hydroperoxidized polyethers are active catalytic agents and must be stored and handled as such.

Eguchi et al, in U.S. Pat. No. 3,398,074, teaches a one-step process for producing a graft composition of a polyether substrate and grafted vinylidene monomers. The process is limited to polyether compositions containing polymerized units of specified monomers, otherwise the ionizing radiation used to generate free radicals would cause backbone chain scisson to occur. The process provides for limited control over the location of the graft site. The specification cautions that the production of significant amounts of vinylidene homopolymer can readily occur unless steps are taken to minimize this.

SUMMARY OF THE INVENTION

The invention provides a polyether polymer composition that is readily usable as a substrate onto which vinylidene monomers can be grafted. The polyether compositions are prepared by polymerizing, either singly, together with each other, or with other cyclic oxy monomers, a trihalomethyl hydrocarbon glycidyl ether of the formula

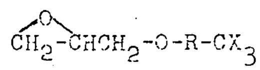

wherein X is —Cl, —Br, or —I and R is an alkyl, cycloalkyl, aryl, alkaryl, or aralkyl radical of one to 12 carbon atoms. Vinylidene monomers are readily grafted onto such compositions by contacting the polyethers with vinylidene monomers in the presence of metal carbonyl complexes and organic derivatives thereof.

DETAILED DESCRIPTION

Distinguishing features of this invention are that the polyether compositions are readily formed in one step during the initial polymerization; that the location and amount of cure site can be controlled; that the compositions are stable until activated by the metal catalysts, that the metal catalysts produce a free radical on the trihalomethyl site and they do not initiate polymerization by themselves, so very little extraneous homopolymer is produced; that any vinylidene monomer capable of free radical polymerization can be employed; and that the grafting conditions can be mild so that polyether chain scisson is minimized. Other features will become evident to those skilled in the art in light of the following detailed disclosure.

The trihalomethyl hydrocarbon glycidyl ethers are of the formula

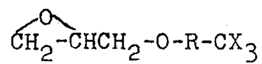

wherein X is —Cl, —Br, or —I and R is a hydrocarbon radical selected from the group consisting of an alkyl radical containing one to 12 carbon atoms, a cycloalkyl radical containing five to eight carbon atoms in the ring, and an aryl, aralkyl, or alkaryl radical containing six to 12 carbon atoms. The alkyl structures may be of linear or branched structure; i.e., may contain primary, secondary, or tertiary carbon structures.

The monomers can be prepared by first preparing an intermediate product by the reaction of a trihalomethyl hydroxy compound with an allyl halide in the presence of a base catalyst, and then epoxidizing the intermediate product, using a peracid, to form the glycidyl structure. Alternatively, the intermediate product can also be reacted with chlorine or bromine in sodium hydroxide to form a halohydrin structure which is then treated with a base to form the glycidyl structure. Since the alternative method of reacting the intermediate involves a two-step procedure using more ingredients, it is preferred to use a peracid to form the glycidyl structure.

Useful trihalomethyl hydroxy compounds are of the formula HO—R—$CX_3$ wherein X is —Cl, —Br, or —I and R is a hydrocarbon radical selected from the group consisting of alkyl radicals containing one to 12 carbon atoms, cycloalkyl radicals containing five to eight carbon atoms in the ring structure, and aryl, alkaryl, or aralkyl radicals containing six to 12 carbon atoms. The alkyl structures may be linear or branched; i.e., may contain primary, secondary, or tertiary carbon structures. Typical examples of such compounds are 2,2,2-trichloroethanol; 2,2,2-tribromoethanol; 4,4,4-triiodobutanol; 8,8,8-trichlorooctanol; 10,10,10-tribromodecanol; 5,5,5-triodo-2-methylpentanol; 6,6,6-tribromo-3-ethyl-5-methylhexanol; 5,5,5-trichloro-3,3-dimethylpentanol; trichloromethyl cyclopentanol; p-tribromomethyl phenol; o-trichloromethyl benzyl alcohol; p-2,2,2-triiodoethyl phenol; and the like. Preferred compounds are those wherein R is an alkyl radical containing one to six carbon atoms such as the first three compounds mentioned above or an aryl radical containing six to eight carbon atoms such as the last three compounds mentioned above. The preferred halides are chlorine and bromine.

The allyl halide can be allyl chloride, allyl bromide, or allyl iodide.

The base catalyst can be sodium or potassium hydroxide, or a sodium or potassium alcoholate such as sodium methoxide, sodium ethoxide, potassium butoxide, and the like.

The intermediate product reaction may be performed in bulk using an excess of the hydroxy compound, but it is preferable to conduct the reaction in a polar, aprotic solvent such as dimethyl sulfoxide, dimethylfuran, dimethoxy ethane, and the like.

The reaction temperature is from about 20° C. to about 120° C. A more preferred range is from about 40° C. to about 80° C.

The intermediate, a trihalomethyl hydrocarbon allyl ether, can be recovered and purified using a combination of filtration, washing and/or extraction, and vacuum distillation procedures.

The allyl structure of the intermediate product is then epoxidized using a peracid to form the desired glycidyl structure. The peracid can be an aliphatic peracid such as peracetic acid and the like, or an aromatic peracid such as perbenzoic acid, metachloroperbenzoic acid, and the like.

The epoxidation may be performed in bulk, but because the peracids are usually solids, it is preferred to conduct the reaction in a solvent for the peracid and the intermediate. Useful solvents are ethanol, tertiary butyl alcohol, ethyl acetate, dimethoxy ethane, and the like. The epoxidation is preferably conducted under a nitrogen atmosphere.

The temperature of the epoxidation reaction is from about 0° C. to about 90° C. It is preferred to conduct the reaction at as high a temperature as possible without causing undesirable effects such as the initiation of polymerization of the allyl structure.

The trihalomethyl hydrocarbon glycidyl ether can be recovered and purified using a combination of filtering, washing and/or extraction, and vacuum distillation procedures.

The monomers of this invention have features which distinguish them from other epoxide-containing monomers such as those disclosed in U.S. Pat. No. 3,214,390. The epoxide structure is in a terminal position making the monomers highly reactive to the polymerization catalysts. The trihalomethyl structure is much more reactive to the metal carbonyl complexes used in the grafting process than an mono- or dihalomethyl structure. The halide is chosen from the group consisting of —Cl, —Br, and —I; and preferably the halide is chlorine or bromine. Fluorine does not react with the metal carbonyl complexes to form the desired graft site. The ether oxy is quite important because trihalomethyl alkylene oxides will not homopolymerize to high molecular weight polyether polymers, and will not readily copolymerize with other epoxy monomers.

The trihalomethyl hydrocarbon glycidyl ethers are used singly, in combination with each other, or with other cyclic oxy $$(\overset{O}{\wedge})$$

containing monomers to prepare useful polyether polymer compositions. Polymerization catalysts include divalent metal carbonates, alkaline earth metal alcoholates, organometallic compounds, and other catalyst complexes, all of which are more fully disclosed in U.S. Pat. NO. 3,417,064. Polymerization temperatures, solvents used, recovery methods, and other features known to the art can be employed to prepare the desired polyether compositions.

If the monomers are polymerized singly or in combination with each other, the polymer obtained will contain from about 30 per cent to about 80 per cent by weight of halide as —Cl, —Br, and/or —I based upon the weight of the polymer. The polymers have molecular weights ranging from about 20,000 to about 10,000,000 as measured with a Gel Permeation Chromatograph using tetrahydrofuran or trichlorobenzene as the solvent, and a reduced specific viscosity of from about 0.3 to about 12 as measured at 25°C. in a mixture of 90 volume per cent toluene and 10 volume percent acetylacetone at a concentration of 0.1 gms. per 100 ml. of solvent mix.

The monomers can also be polymerized with other cyclic oxy-containing monomers to prepare useful polyether compositions. By other cyclic oxy-containing monomers is meant compounds containing an epoxide

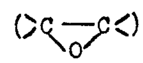

structure which are known in the art as being monomers for the preparation of polyether compositions, and compounds containing cyclic ether structures that are known in the art as capable of being polymerized using epoxide monomer catalysts to prepare polyether compositions.

Examples of epoxide monomers are alkylene oxides such as ethylene oxide, propylene oxide, 2,3-butylene oxide, 2,3-epoxyhexane, 1,2-epoxydecane, annd the like; substituted alkylene oxides such as 5-butyl-3,4-epoxyoctane, 4-methyl-1,2-epoxypentane, 1-ethoxy-2,3-epoxybutane, 4-cyclohexyl-2,3-epoxypentane, 5-benzyl-2,3-epoxyheptane, and the like; halogen-substituted alkylene oxides such as epichlorohydrin, epibromohydrin, 4-chloro-1,2-epoxybutane, 1,1,1- trichloro-3,4-epoxybutane, and the like; cycloaliphatic oxides such as cyclohexene oxide, cyclooctene oxide, and the like; aromatic oxides such as styrene oxide, ethyl styrene oxide, and chlorostyrene oxide; dienic oxides such as butadiene monoxide, hexadiene monoxide, and the like; glycidyl ethers such as methyl glycidyl ether, ethyl glycidyl ether, chlorobutyl glycidyl ether, and the like, and phenyl glycidyl ether, benzyl glycidyl ether, and the like; and allyl glycidyl ether and the like; glycidyl esters such as glycidyl acrylate, glycidyl methacrylate, and epoxy vinyl esters such as 2,3-epoxypropyl acrylate, 4,5-epoxyhexyl acrylate, and the like; and epoxy resins such as the epichlorohydrin — Bisphenol A resins, Epoxy-Novolak resins, and the like. Preferred epoxide-containing monomers to be used with the monomers of this invention are the 1,2-alkylene oxides containing two to six carbon atoms, the halogen-substituted alkylene oxides containing two to six carbon atoms, and glycidyl ethers where the ether oxy radical is an alkyl group containing one to six carbon atoms.

Examples of compounds containing oxy ring structures capable of being polymerized by epoxide monomer catalysts are oxetanes such as trimethyloxetane, 2,3-dimethyl oxetane, 2-phenyl oxetane, 3-cyclohexyl oxetane, 3-methoxy methyl oxetane, and the like; and tetrahydrofurans such as tetrahydrofuran, 2,3-dimethyl tetrahydrofuran, and the like.

The amount of other cyclic oxy-containing monomer copolymerized with the monomers of this invention ranges from a polymer composition containing one monomer unit of an other cyclic oxy-containing monomer to a polymer composition containing one monomer unit of a trihalomethyl hydrocarbon glycidyl ether. A more preferred polymer composition would contain a majority of monomer units of other cyclic oxy-containing monomers. Whereas, a preferred polyether polymer composition would contain about 0.01 per cent to about 20 per cent by weight of a trihalomethyl hydrocarbon glycidyl ether based upon the weight of the polymer. Within this preferred range, the polymer would contain from 0.003 per cent to about 16 per cent by weight of halide, as —Cl, —Br, or —I as in a (—O—R—$CX_3$) structure, based on the weight of the polymer. The polymers have molecular weights ranging from about 20,000 to about 10,000,000 as measured with a Gel Permeation Chromatograph using tetrahydrofuran or trichlorobenzene as the solvent, and a reduced specific viscosity of from about 0.3 to about 12 as measured at 25° C. in a mixture of 90 volume per cent toluene and 10 volume per cent acetylacetone at a concentration of 0.1 gms. per 100 ml. of solvent mix.

The polymer compositions wherein the total halide content is at least a% by weight based upon the polymer, can be vulcanized to form useful rubber articles. Vulcanizing agents include amines having at least two nitrogen atoms such as ethylenediamine, tetraethylenediamine, p-phenylenediamine, naphthalene diamine, piperazine, pyrazine, diethylene triamine, and the like; amine salts such as hexamethylenediamine carbamate and the like; thioureas used with acid acceptors such as $Pb_2O_3$, ZnO, and the like; amines used with thiruam sulfides such as tetramethyl thiruam monosulfide, tetraethylthiruam disulfide, and the like; amines used with thiazoles such as 2-mercaptobenzothiazole, 2-ethylbenzothiazole, benzothiazyl disulfide, and the like; amines used with dithiocarbamates such as zinc dimethyldithiocarbamate, piperidinium pentamethylene dithiocarbamate, and the like; and polyfunctional sydnones as described in U.S. Pat. No. 3,448,063.

The vulcanizing agents may be admixed with the polyether polymers using two- and three-roll mills, calenders, internal mixing equipment such as Banburys and extruders, and like equipment. Ingredients such as carbon blacks, clays, calcium carbonates, silicas, asbestos, and other fillers; pigments such as titanium dioxide, zinc oxide, and the like; plasticizers and oils and waxes; antioxidants and stabilizers; and other additives known to the art can be similarly incorporated to obtain useful compounded products.

Cure time and temperature vary as to the polymeric composition and specific vulcanizing agents and additives used. A useful range would include temperatures from about 250° F. to about 360° F. and times from about 5 minutes to about 80 minutes.

The compounds composition can be molded, calendered, extruded, and such to form useful rubbery articles such as seals, gaskets, valve seats, diaphragms, hoses, belts, inner liners, coated fabrics, and the like.

Polyether polymer compositions containing the necessary trihalomethyl sites are useful as graft substrates onto which vinylidene monomers can be grafted using metal carbonyl complexes and organic derivatives thereof.

These compositions are obtained by polymerizing epoxide monomers which contain such sites. Examples of trihalomethyl containing epoxide monomers are trichloromethyl glycidyl ether; omega trihalomethyl alkylene oxides such as 1,1,1-trichloro-2,3-epoxypropane and the like; and the monomers of this invention. Because of the convenience of their preparation and their ability to readily homopolymerize or copolymerize with other epoxide monomers, the monomers of this invention are particularly useful for the preparation of polyether graft substrates.

Examples of useful metal complexes are molybdenum hexacarbonyl, chromium hexacarbonyl, iron pentacarbonyl, tetra-cobalt dodecacarbonyl, and the like; triphenyl trinickel dicarbonyl, phenyl manganese tricarbonyl, benzyl manganese tricarbonyl, diphenyl diiron tetracarbonyl, and the like; and bisdiphenyl phosphite dinickel tetracarbonyl, bis-triphenylphosphite nickel carbonyl, tetrakis-triphenylphosphite nickel, and the like. A more extensive disclosure can be found in British Pat. No. 1,086,066.

The grafting conditions are similar to those employed as described within Bamford et al, Journal of Polymer Science, Part C. No. 23, Pages 419–432 (1968), and Bamford et al, Journal of Polymer Science, Part C, No. 16, Pages 2,425–2,434 (1967). Preferably the reaction is conducted in a solvent such as benzene, toluene, and the like. Temperatures and times vary as to the metal carbonyl complex used and the choice of vinylidene monomer. A broad temperature range is from about 0°C. to about 100°C.

Vinylidene monomers, containing a terminal

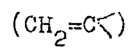

group, useful for grafting include all of the vinylidene monomers capable of being polymerized via free radicals. Examples of such monomers are acrylates such as methyl acrylate, ethyl acrylate, isobutyl acrylate, hexyl acrylate, dodecyl acrylate, methyl methacrylate, n-butyl methacrylate, ethyl ethacrylate, hydroxy ethyl acrylate, methoxy ethyl acrylate, cyclohexyl acrylate, phenyl acrylate, glycidyl acrylate, and the like; vinyl esters such as vinyl acetate, vinyl butyrate, vinyl benzoate, vinyl chloroacetate, and the like; allyl esters such as allyl acetate, methallyl propionate, and the like; allyl ethers such as allyl methyl ether; allyl alcohols such as methallyl alcohol; vinyl ethers, and vinyl alcohols such as ethyl vinyl ether, butyl vinyl ether, cyclohexyl vinyl ether, benzyl vinyl ether, vinyl benzyl alcohol, crotyl alcohol and the like; vinyl halides such as vinyl chloride, vinylidene chloride, and the like; vinyl amides such as acrylamide, N-methyl acrylamide, N-phenyl acrylamide, N-methylol acrylamide, p-vinyl benzamide, and the like; vinyl aromatics such as styrene, α-methyl styrene, monochlorostyrene, and the like; olefinically unsaturated nitriles such as acrylonitrile, methacrylonitrile, crotononitrile, and the like; olefinically unsaturated acids such as acrylic acid, maleic acid, mesaconic acid, vinylacetic acid, cinnamic acid, and the like; diolefins such as 1,3-butadiene, isoprene, 2,3-dimethyl butadiene, chloroprene, 1,5-hexadiene, and the like; and divinyls such as divinyl ether, diallyl ether, diethylene glycol diacrylate, and the like.

The grafted polyether polymer compositions can be recovered by coagulating the polymer solution with water, water/methanol solutions, or heptane or by drying down the solutions under a vacuum.

The amount of grafted vinylidene monomer ranges from about 5% to about 500% by weight based upon the original polyether polymer being 100% by weight.

The choice of vinylidene monomers which can be grafted onto the polyether polymer compositions of this invention is quite large. The properties, then, of the prepared polyether graft polymers can be quite diverse. Broad objectives to be obtained through the preparation of grafted polyether polymers include the alteration of swell and solubility characteristics of the polyether, and an improvement in the compatibility of polymeric polyethers with other polymers. Some examples of such objectives would be; if dienic monomers were used in whole or in part, a sulfur curable polyether composition; if hydroxy or carboxyl-containing monomers were used in whole or in part, a polyether composition having increased swell and solubility in water; if amide or nitrilecontaining monomers were used in whole or in part, a polyether composition having increased affinity for dyes; if high Tg producing monomers were used such as styrene, acrylonitrile, vinyl chloride, methacrylates, and the like, a polyether composition having stiffer or re-enforced properties, or a thermoplastic polyether composition; if unsaturated hydrocarbon monomers were used such as alkenes or dienes, a polyether composition having increased swell or solubility in hydrocarbon solvents, or a polyether polymer having increased compatibility with dienic polymers such as natural rubber, polyisoprene, polybutadiene, butyl rubber, butadiene-acrylonitrile polymers, styrene-butadiene polymers, ethylene-propylene polymers, ethylene-propylene-diene polymers, and the like.

The following EXamples serve to more fully disclose the invention. Ingredients used are given in grams unless otherwise indicated.

EXAMPLE I 1,1,1-Trichloroethyl glycidyl ether was prepared using a two-step procedure.

A. The intermediate product, 1,1,1-trichloroethyl allyl ether, was prepared. The reactor vessel consisted of a flask equipped with a mechanical stirrer, a condenser, a thermometer, and a dropping funnel. The reaction was performed under a slight nitrogen pressure. 85.22 gms. (100 ml.) of dimethoxyethane, 6.0 gms. (0.11 moles) of sodium methoxide, and 16.63 gms (0.11 moles) of trichloroethanol were charged to the reactor vessel and agitated until the alcoholate was completely dissolved. The pot temperature was kept at round 40° C ± 5° C. with cooling water. 9.68 gms. (0.12 moles) of allyl chloride was then added dropwise into the solution while stirring. Pot temperature was maintained at 28° C. ± 3° C. After all the allyl chloride was added, the pot solution was stirred for 4 hours at 30° C. and then for 2.5 hours at 50° C. The resulting solution was a dark brown color.

The pot solution was then vacuum filtered to remove solids (salt) and then washed with portions of water until the water wash phases were essentially neutral in pH and colorless. Each of the wash solution phases was saved and later extracted with ethyl ether to recover any product that might be contained in the wash phases. The ether extracts were added to the organic phase that remained after the water washing of the pot solution. The total organic phase was then dried over anhydrous $Na_2SO_4$. The phase was then distilled, using a packed column, first at atmospheric and then under reduced pressure. A fraction coming over at 56° C. to 87° C. at 14 mm of Hg pressure was saved. This fraction was re-distilled and a fraction coming over at 74° C. to 77° C. at 34 mm Hg pressure was obtained. The recovered distillate was analyzed by gas chromatography to contain 35.8% by weight of a product later identified by NMR analysis to be 1,1,1-trichloroethyl allyl ether. The 2.16 gms obtained represented a yield of about 10% of theoretical yield.

The procedure was essentially repeated at a scaleup factor of 6, except for the fact that the pot solution was neutralized with 1 normal hydrochloric acid after the reaction and prior to filtration. Two distillate fractions, one obtained at 46° C. to 52° C. at 11 mm of Hg and the other at 56° C. to 58° C. at 10 mm of Hg pressure, were saved and analyzed by GC to be 26.6% and 38.5% by weight of 1,1,1-trichloroethyl allyl ether respectively. The recovered weight of 20.2 gms. represented a yield of about 16% of the theoretical yield.

B. 1,1,1-Trichloroethyl allyl ether was used to prepare the desired glycidyl monomer. The reaction was performed under a slight nitrogen pressure. 80.9 gms of a mixture containing 46.0 gms. (0.242 moles) of 1,1,1-trichloroethyl allyl ether and 100 ml. of dry benzene were charged to a reactor vessel similar to that of procedure A. 51.0 gms. (0.25 moles) of monochloroperbenzoic acid (85% minimum assay) was dissolved in 900 ml. of dry benzene and the solution added to the reactor vessel. No exotherm occurred on the addition. The pot solution was agitated for 27.6 hours total at a temperature of 25° C. The solution was then cooled to 6° C. and vacuum filtered to remove solids (unreacted peracid). The filtrate liquor was then distilled at reduced pressure, stopping at various times to vacuum filter out suspended solids from the bottoms liquor.

Three distillate fractions were saved, coming over at 25° C. to 53° C. at 35 mm to 0.3 mm, at 87° to 88° C at 0.6 mm, and at 93° to 94° C. at 0.6 mm Hg pressure respectively. Total weight of the fractions was 61.4 gms.

The procedure was essentially repeated but at a higher temperature of reaction. 60.9 gms. of a mixture containing 47.5 gms. (0.25 moles) of 1,1,1-trichloroethyl allyl ether, 100 ml. of benzene, and 51.0 gms (0.25 moles) of monochloro-perbenzoic acid dissolved in 1000 ml. of benzene were charged to the reactor vessel at 25° C. The solution was heated to 80° C. for 5.4 hours while being agitated. The solution was then cooled down to 6° C. and vacuum filtered. The filtrate liquor was distilled at reduced pressure. A fraction that came over at 56° to 91° C. at 0.3 mmHg pressure was saved. Total weight of the fraction was 57.9 gms.

The three fractions from the first run and the fraction from the second run were combined and distilled at reduced pressure. Two distillate fractions, coming over at 61° to 62° C. at 0.1 mm and at 63° to 64° C. at 0.1 mmHg pressure, were obtained. The first fraction, fraction A, weighing 52.3 gms. was analyzed by GC to be 96.6 weight per cent, and the second fraction, fraction B, weighing 9.9 gms. was analyzed by GC to be 99.6 weight per cent of 1,1,1-trichloroethyl glycidyl ether. Combined weight of product was 60.5 gms. which represented a combined yield of 58.8% of the total theoretical yield.

EXAMPLE II

Part of the 1,1,1-trichloroethyl glycidyl ether monomer prepared in procedure B of Example I was polymerized to obtain a polyether homopolymer composition having pendant trichloromethyl groups. The recipes used were as follows:

| | 1 | 2 | 3 |
|---|---|---|---|
| 1,1,1-trichloroethyl glycidyl ether, gms. | 2.77[1] | 2.77[2] | |
| 4,4,4-trichlorobutylene oxide, gms. | | | 2.86 |
| Organometallic catalyst[3], gms. | 0.99 | 0.93 | 0.90 |
| Toluene, gms. | 8.61 | 8.57 | 8.58 |

[1] monomer for fraction A of procedure B of Ex. I
[2] monomer from fraction B of procedure B of Ex. I
[3] trialkyl aluminum complex The toluene, monomer, and catalyst were injected into nitrogen purged, capped polymerization tubes. The tubes were then placed into a 50° C. bath. Sample 3 was an attempt at homopolymerizing a trichloromethyl alkylene oxide. After 83 minutes in the bath, samples 1 and 2 were viscous solutions, while sample 3 was still a thin fluid. After 177 minutes the tubes were withdrawn from the bath, opened, and the contents each poured into separate containers having 150 ml. of solvent grade heptane and stirred. The solutions were then dried down at 70° to 75° C. for 7 hours. The weights of polymer corrected for the catalyst content obtained were 1.05 gms. for sample 1, 1.21 gms. for sample 2, and 0 gms. for sample 3. The per cent conversions were 37.9%, 43.7% and 0.0% respectively. The homopolymers obtained were high molecular weight, snappy rubbers.

EXAMPLE III

Part of the 1,1,1-trichloroethyl glycidyl ether prepared in procedure B of Example I was copolymerized with propylene oxide and epibromohydrin to obtain a polyether copolymer composition having pendant trichloromethyl groups.

The recipe used was as follows:

| | |
|---|---|
| 1,1,1-trichloroethyl glycidyl ether, gms. | 15.0 |
| Propylene oxide, gms. | 70.1 |
| Epibromohydrin, gms. | 15.2 |
| Organometallic catalyst[1], gms. of solution | 17.4 |
| Toluene, gms. | 434.5 |

[1] trialkyl aluminum complex

The propylene oxide to epibromohydrin to trichloroethyl glycidyl ether weight per cent ratio used was about 70/15/15. The ingredients were injected into a nitrogen purged, capped glass bottle, and then the bottle tumbled in a 50° C. bath for 7.0 hours. Per cent conversion of monomer to polymer was followed by taking per cent total solids samples. After 7.0 hours, an alcohol was injected to de-activate the catalyst. Final conversion was 35.1%. The polymer solution was dried down under a vacuum at 30° C. The polymer obtained was then redissolved in THF and precipitated using a water-methanol mix and dried under vacuum for 6 hours at 30° C. 30.3 gms. of polyether polymer was obtained. The chlorine content was 6.1% by weight and the bromine conent 4.9% by weight. The polymer composition was then about 12% by weight of 1,1,1-trichloroethyl glycidyl ether, about 8% by weight of epibromohydrin, and about 80% by weight of propylene oxide. The copolymer obtained was a high molecular weight, snappy rubber.

EXAMPLE IV

The copolymerization procedure of Example III was repeated using a propylene oxide to epibromohydrin to 1,1,1-trichloroethyl glycidyl ether ratio of about 80/10/10 versus the 70/15/15 of the previous example. The measured conversion was 45% after 3.0 hours at 50° C. plus 50 minutes at 40° C. The polyether copolymer composition prepared contained about 8% by weight of 1,1,1-trichloroethyl glycidyl ether, about 5% by weight of epibromohydrin, and about 87% by weight of propylene oxide. The copolymer obtained was a high molecular weight, snappy rubber.

In contrast to the use of the monomers of this invention, the known trichloromethyl alkylene oxides copolymerize quite slowly with other epoxide monomers and the copolymers obtained are soft and sticky. A series of copolymerizations of 4,4,4-trichlorobutylene oxide with propylene oxide was run. The polymerizations were run in toluene using the same trialkylaluminum catalyst as above. The weight per cent monomer charged versus the weight per cent of monomer in the copolymer is shown in the following table. Comparisons are at about 20% conversion of monomers.

| Weight percent 4,4,4-trichlorobutylene oxide charged as monomer | found in polymer |
|---|---|
| 5.9 | 0.7 |
| 13.7 | 1.1 |

-Continued

| Weight percent 4,4,4-trichlorobutylene oxide | |
|---|---|
| charged as monomer | found in polymer |
| 25.4 | 1.6 |
| 68.6 | 10.8 |

EXAMPLE V

The copolymer of 1,1,1-trichloroethyl glycidyl ether, epibromohydrin, and propylene oxide prepared in Example III was used as a polyether substrate onto which ethyl acrylate and vinyl chloroacetate monomers were grafted. The recipe used was as follows:

| | |
|---|---|
| Polyether substrate, gms. | 29.4 |
| Ethyl acrylate, gms. | 92.5 |
| Vinyl chloroacetate, gms. | 19.0 |
| Metal carbonyl complex[1], gms. | 0.4 |
| Benzene, gms. | 428.8 |

[1] bis-triphenyl phosphine dicarbonyl nickel

The polyether polymer was dissolved in the benzene and put into a nitrogen purged glass bottle. The ethyl acrylate, vinyl chloroacetate, and catalyst were added under nitrogen and the bottle capped. The bottle was then tumbled for 7.3 hours at 48° C. After this the polymer solution was poured onto a plate and vacuum dried. The recovered weight of graft polymer was 82.8 gms. Based on this the polymer had a 64.5% by weight content of ethyl acrylate and vinyl chloroacetate.

The prepared graft polymer was cured using the following recipe:

| | |
|---|---|
| Graft polymer | 100 |
| FEF black | 30 |
| Zinc stearate | 1 |
| Red lead | 5 |
| Ethylene thiourea | 1.5 |

After 15 minutes at 347° F., the graft polymer had a 1,075 psi tensile, a 300% elongation, and a 50 durometer A hardness.

When the example is repeated using 1,3-butadiene, isoprene, and the like in whole or in part as the vinylidene monomers, a sulfur-curable polyether graft polymer is produced. This graft has special utility in physical blends with dienic polymers such as polybutadiene, polyisoprene, Epdm, and like polymers as the grafted portion makes the polyether graft polymer more compatible with them and lets one use a common sulfur cure system for the blend such as sulfur with mercaptobenzylthiozole, tetramethylene thiruam disulfide, and the like.

When the example is repeated using methymethacrylate, styrene, vinyl chloride, and the like as the vinylidene monomer, a hard tough polyether graft polymer is produced that exhibits thermoplastic properties.

We claim:

1. A graft polymer consisting of a polyether polymer containing interpolymerized units of a trihalomethyl hydrocarbon glycidyl ether of the formula

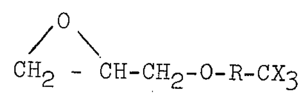

wherein X is a halogen selected from the group consisting of chlorine, bromine, and iodine, and R is a hydrocarbon group selected from the group consisting of alkyl radicals containing one to 12 carbon atoms, cycloalkyl radicals containing five to eight carbon atoms in the ring, and aryl, aralkyl, and alkaryl radicals containing six to 12 carbon atoms, having grafted thereon at least one vinylidene monomer, said graft being catalyzed by a metal carbonyl complex to produce grafting of said vinylidene monomer onto the trihalomethyl site of said polymer.

2. A graft polymer of claim 1 wherein the polyether polymer is a homopolymer of the trihalomethyl hydrocarbon glycidyl ether wherein the R group is an alkyl radical containing one to six carbon atoms.

3. A graft polymer of claim 2 wherein the polyether polymer is a homopolymer of 1,1,1-trichloroethyl glycidyl ether.

4. A graft polymer of claim 1 wherein the polyether polymer is an interpolymer of from about 0.01 percent to about 20 percent by weight of the trihalomethyl hydrocarbon glycidyl ether, from about 70 percent to about 99 percent by weight of an alkylene oxide of the formula

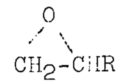

wherein R is hydrogen or an alkyl group containing one to four carbon atoms, and up to about 10 percent by weight of a halogen-substituted alkylene oxide of the formula

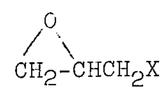

wherein X is —Cl, —Br, —I, or —F.

5. A graft polymer of claim 4 wherein the polyether polymer is an interpolymer of a trihalomethyl hydrocarbon glycidyl ether wherein the R group is an alkyl radical of one to six carbon atoms, ethylene or propylene oxide, and epichlorohydrin or epibromohydrin.

6. A graft polymer of claim 5 wherein the polyether polymer is an interpolymer of 1,1,1-trichloroethyl glycidyl ether, propylene oxide, and epibromohydrin.

7. A graft polymer of claim 6 wherein the vinylidene monomers grafted thereon are ethyl acrylate and vinyl chloroacetate.

* * * * *

UNITED STATES PATENT OFFICE

CERTIFICATE OF CORRECTION

PATENT NO. : 3,880,957

DATED : April 29, 1975

INVENTOR(S) : Harold A. Tucker & Richard V. Kemp

It is certified that error appears in the above-identified patent and that said Letters Patent are hereby corrected as shown below:

Column 1, line 45, after the word "monomer(s)", delete --(s)--. Column 4, line 62, the word "annd" should read --and--. Column 5, line 54, the "a%" should read --2%--. Column 6, line 19, the word "compounds" should read --compounded--.

Signed and Sealed this

*ninth* Day of *September 1975*

[SEAL]

*Attest:*

RUTH C. MASON
*Attesting Officer*

C. MARSHALL DANN
*Commissioner of Patents and Trademarks*